UNITED STATES PATENT OFFICE.

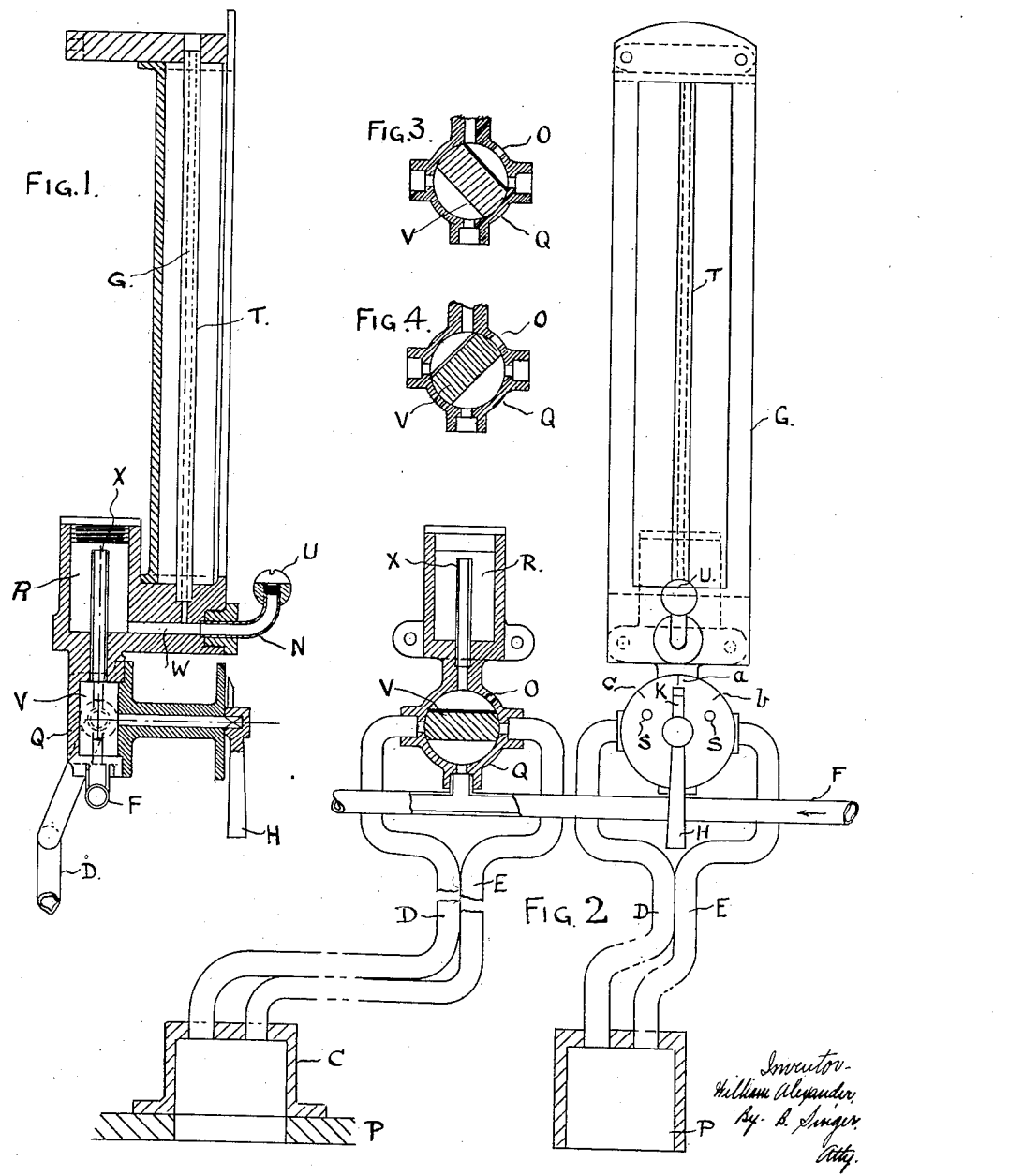

WILLIAM ALEXANDER, OF GLASGOW, SCOTLAND.

DEPTH, DRAFT, AND DISPLACEMENT INDICATOR.

1,359,014.

Specification of Letters Patent.

Patented Nov. 16, 1920.

Application filed June 1, 1920. Serial No. 385,742.

*To all whom it may concern:*

Be it known that I, WILLIAM ALEXANDER, a subject of the King of Great Britain and Ireland, residing at 1 Broomhill avenue, Whiteinch, Glasgow, Scotland, have invented certain new and useful Improved Depth, Draft, and Displacement Indicators, of which the following is a specification.

The invention relates to instruments for determining the draft or displacement of bodies and vessels floating in liquids or for determining the depth of liquid in vessels or reservoirs, by which type of instrument the hydrostatic pressure of the liquid is balanced by air or gas pressure, which pressure is communicated to a pressure-gage usually calibrated to give depth of liquid, or draft, or displacement of a body floating in the liquid, as the case may be.

In instruments hitherto in use the pressure-gage is in fluid connection with and is attached to the upper end or near the upper end of a main tube which is open at the lower end at or near the point where the depth or draft is required, or at a point so situated that the displacement can be ascertained. Compressed air is supplied by a branch pipe near the upper end of the main pipe by means of an independent air-compressor or from any source of compressed air. This arrangement suffers from the objection that, due to the air or gas resistance in the main tube, the pressure exerted in the pressure gage is more than that corresponding to the hydrostatic head of liquid because of the resistance to flow of air in the pipe, thus the indication of the pressure gage is more than it should be. This error is greater the faster the flow in the pipe.

In another prior instrument the source of pressure is arranged to be in fluid connection, through a valve or controlling device, with a pipe or passage extending from the gage to the place where the depth is required, being thus far substantially the same in construction and subject to the same objections stated with relation to the first cited instrument. In the said other prior instrument there are provided branch tubes both communicating by way of a common duct with the point where the pressure is to be determined, one of these tubes also communicating with a pressure gage, while the other communicates with a source of pressure.

In yet still another prior instrument there is provided a valve similar mechanically to that of the present application, that is, a cylindrical member rotatable in a casing, but having a different purpose, namely, closing the fluid connection between a single main tube or conduit and the gage while opening the connection between the main tube and the source of pressure and vice versa. This arrangement suffers from the objection that the instrument is not designed to show readings without being reset.

The object of the present invention is to provide an improved instrument that will enable accurate continuous readings of draft, depth or displacement to be made this being accomplished because of the elimination of resistance errors, while air or gas is flowing, by the provision of an appropriate controlling device, and two tubes extending from said controlling device to the place where depth, or displacement is required, the said controlling device alternately enabling (1) the source of pressure and the gage to be put in indirect communication with each other through the whole length of both tubes and the said place, (2) the source of pressure to be shut off from the gage and both of the said tubes.

A further improvement is the provision of a convenient device for easy filling and emptying of the gage reservoir.

Another objection in the earlier instruments is that, because of the resistance referred to, it is impossible for a number of gages, connected to one source of compressed air to give accurate simultaneous readings when the depth being recorded or the readings are sensibly different from one another, also with the liquid type of gage, the liquid can be blown out of the stand-tube.

One form of the improved instrument is shown in the accompanying drawings. Figure 1 is a side sectional elevation.

Fig. 2 is a part sectional and part outside front elevation of the instrument arranged with two gages.

Fig. 3 shows the operating valve in the starting position.

Fig. 4 shows the valve in the working position.

The pressure gage G consists of a reservoir R in fluid connection with the transparent stand-tube T, through the connection W. Pressure is transmitted to the gage through the pipe X which opens into the reservoir at its upper end above the level of the liquid in the reservoir. Any other suitable type of gage may be employed.

To overcome the said objections residing in the earlier instruments, the gage G in the improved instrument, is connected through a valve V, to the place P where the depth or draft is required, or to such a point near the middle of a floating vessel as will enable the displacement to be indicated, by means of an additional and separate pipe D from the pipe E conveying compressed air to such point. By this arrangement when the depth draft or displacement is steady, there is no current of air in pipe D, so that no resistance is engendered. This elimination of resistance results in the reading of the gage agreeing exactly with the depth, draft, or displacement which is being indicated, no matter how fast the flow of compressed air in the pipe E conveying compressed air to the point P; and it follows that any desired number of gages can be arranged to give accurate simultaneous readings differing considerably among themselves. Further, the pressure in the gages can never be greater than the hydrostatic head at P, consequently with the liquid type of gage, it is impossible to blow the liquid out of the stand-tube. The lower end of the pipes D and E may open into a chamber C which has fluid connection with the liquid at P A second improvement is the provision of a rotary valve V for each gage and for effecting several operations. This valve consists of a casing Q with four branches permitting fluid connection respectively to the pressure gage, to the compressor or some source of compressed air supplied through pipe F, to the pipe D and to the pipe E; there is also provided an outlet O from the casing to the atmosphere. Stops S prevent the valve being turned through more than the required angle.

By placing the handle H, Fig. 2, and rigidly attached pointer K in the positions *a*, *b*, *c*, the valve takes up positions shown in Fig. 2, Fig. 3 and Fig. 4 respectively, and will allow the corresponding operations to be effected, namely:

(*a*) Subjecting the gage to atmospheric pressure and simultaneously shutting off from pipes D and E compressed air supplied by pipe F.

(*b*) Clearing out of any liquid that may have collected in pipe D.

(*c*) Allowing compressed air from pipe F to pass through pipe E, and simultaneously allowing pipe D to communicate with the pressure gage.

The accuracy of the zero of the gage is tested by putting valve in position (*a*) the instrument is started by next putting the valve in positon (*b*) for a few seconds, and it will then give correct readings by turning the valve to the working position (*c*).

A third improvement, in other cases where the liquid type of gage is employed, is the provision of a rotatable hollow pipe N in fluid connection with the said reservoir. When this pipe is turned to point downward the reservoir can be emptied of liquid, and when turned to point upward, because of its length being suitable, enables the reservoir to be easily filled with liquid to the proper level. A plug U is provided for closing the said pipe N.

The applicant does not confine himself to the particular design of details illustrated.

Claims:

1. In means for determining the depth of liquid, or the draft and displacement of floating bodies, the combination with a source of air pressure and a pressure gage suitably calibrated, of two tubes opening to a common outlet at the place where depth or displacement is required, and a controlling device whereby the opposite ends of these tubes may be connected respectively to the source of air pressure and the pressure gage.

2. In means for determining the depth of liquid or the draft and displacement of floating bodies, the combination with a source of air pressure and a pressure gage suitably calibrated, of two tubes opening into a common outlet at the place where depth or displacement is required, and a controlling device whereby the opposite ends of these tubes may be simultaneously connected respectively with the source of air pressure and the pressure gage.

In testimony whereof I affix my signature in presence of two witnesses.

WM. ALEXANDER.

Witnesses:
 JOHN LIDDLE,
 JOHN TRAIN LIDDLE.